(12) United States Patent
Waldbauer (10) Patent No.: US 8,733,684 B2
(45) Date of Patent: May 27, 2014

(54) COLLAPSIBLE SPOOL HOLDER

(76) Inventor: Dennis Waldbauer, Hillsborough, NC (US)

( * ) Notice: Subject to any disclaimer, the term of this patent is extended or adjusted under 35 U.S.C. 154(b) by 521 days.

(21) Appl. No.: 13/085,553

(22) Filed: Apr. 13, 2011

(65) Prior Publication Data

US 2012/0261507 A1 Oct. 18, 2012

(51) Int. Cl.
*A01K 89/00* (2006.01)
*B65H 75/22* (2006.01)

(52) U.S. Cl.
CPC .................................. *A01K 89/003* (2013.01)
USPC ...................................... 242/401; 242/404.3

(58) Field of Classification Search
CPC .................................................... A01K 89/003
USPC ........ 242/401, 599.1, 599, 598.2, 598, 298.1, 242/298.3, 599.3, 599.2, 596, 596.1, 596.2, 242/596.3, 596.4, 596.7, 596.8
See application file for complete search history.

(56) References Cited

U.S. PATENT DOCUMENTS

| | | | | |
|---|---|---|---|---|
| 565,562 A | * | 8/1896 | Perot | 242/129.6 |
| 2,146,038 A | * | 2/1939 | West | 242/564.4 |
| 2,848,778 A | * | 8/1958 | Plummer, Sr. et al. | 24/535 |
| 3,026,059 A | * | 3/1962 | Dennler | 242/593 |
| 3,679,151 A | * | 7/1972 | Rice | 242/423.1 |
| 3,685,761 A | * | 8/1972 | Zelinski | 242/129.7 |
| 3,951,354 A | * | 4/1976 | Bagby | 242/129.8 |
| 4,034,930 A | * | 7/1977 | Stevenson | 242/422.4 |
| 4,776,527 A | * | 10/1988 | Prowant | 242/591 |
| 5,218,779 A | * | 6/1993 | Morgan et al. | 43/25 |
| 5,513,463 A | * | 5/1996 | Drinkwater | 43/25 |
| 5,839,687 A | * | 11/1998 | Magnafici | 242/404.3 |
| 6,742,737 B1 | * | 6/2004 | Conner | 242/323 |

* cited by examiner

*Primary Examiner* — Emmanuel M Marcelo
*Assistant Examiner* — Justin Stefanon
(74) *Attorney, Agent, or Firm* — Megan Lyman (57) ABSTRACT

This invention is a new portable and collapsible fishing line spool holder that can be hung from a fishing rod eyelet to permit the winding of the fishing line from the spool onto the fishing rod's reel. The present invention avoids common problems of twisting and line tension during transfer from spool to reel. Moreover, the present invention is collapsible, simple to load, and easily transportable.

13 Claims, 9 Drawing Sheets

COLLAPSIBLE SPOOL HOLDER

FIELD OF THE INVENTION

This invention relates generally to fishing spool holders and more particularly pertains to a new portable and collapsible fishing line spool holder that can be hung from a fishing rod eyelet to permit the winding of the fishing line from the spool onto the fishing rod's reel.

BACKGROUND

The use of fishing spool holders is well known in the prior art. Over time, the fishing line on a reel must be replaced. The fishing line may be also be replaced voluntarily depending on the environment of the fishing rod's use. Fishing spool holders have been developed to aid in the cumbersome task of transferring fishing line from the spool to the reel.

Many existing spool holders create tension on the fishing line when transferring to the reel. Such tension results in poor casting and inefficiency of use. Other spool holders can also introduce twists or kinks in the fishing line on the reel, which inhibits the efficiency of the rod and decreases the ability to cast properly. Many prior disclosures attempt to provide a system for transferring fishing line from rod to reel. These prior art use a clamp-type mechanism to attach the spool holder to the fishing rod, thus introducing tension onto the fishing rod that can result in breaks or fractures in the rod itself. Moreover, the designs of prior spool holders having a clamp-type attachment to the fishing rod work by pulling the fishing line from the spool, which creates tension in the top part of the fishing pole. These results are disadvantageous to the proper functioning of the fishing pole and the fishing line once transferred to the reel.

For example U.S. Pat. No. 4,776,527 describes a spool holder that mounts onto the to the fishing rod itself via two pieces connected with a screw and a wing nut (a clamp-type mounting). A rectangular piece holds the spool and is attached to the fishing rod. The reel of the fishing rod is fed from the spool on the rectangular piece. The static attachment of the spool holder to the rod creates tension on the spool, and thus would introduce tension onto the fishing line when on the reel. Moreover, this spool holder may cause cracks or fractures to the fishing rod due to the clamp-type mounting, which would impact the performance and durability of the fishing rod.

In another example, U.S. Pat. No. 6,640,484 describes a fishing line loading device that also attaches securely with a clamp-type securing structure to the fishing rod with fasteners that are to be tightened before the loading device is used. There securing structure is described as applying functional drag resistance to the supply spool. The application of resistance to the spool necessarily introduces tension in the fishing line, which will be in the line once transferred to the reel. This tension results in inefficient casting. The design of the apparatus is large and cumbersome, and again the clamp-type securing structure can introduce fractures and cracks into the fishing rod when in use, thus diminishing the performance and durability of the fishing rod.

U.S. Pat. No. 5,375,788 describes a collapsible tool for transferring fishing line from spool to reel. This spool holder is also designed to impose resistance on the line, thus introducing tension in the fishing line when on the reel and causing twists and kinks in the line. Again, the holder is attached to the rod with a clamp-type piece, which can introduce fractures and cracks into the fishing rod.

U.S. Pat. No. 6,742,737 describes a spool holder again securely anchored to the reel and an added piece feeds the line to the reel in between the spool holder and the reel. A nut is provided to adjust the pulling force between the spool holder and the reel. This design also introduces tension, as is taught in the disclosure. The attachment means to the new rod may also introduce cracks and fractures into the fishing rod. Other patents describe essentially the spool holder that is securely attached to the rod and allows the user to add tension to the line (see also U.S. Pat. No. 6,609,673).

These prior art do not provide for a device that virtually eliminates tension in the fishing line, and is easily removable from the fishing rod, so that the spool holder does not interfere with the use of the rod. Additionally, the present invention will not cause damage to the rod because it is not attached to the rod with a clamp, but hangs from an eyelet on the rod. Moreover, it would be advantageous to have a spool holder that is readily detachable, and is easily transportable to the site where the rod will be used. None of the prior art provide for a spool holder that may collapse into a smaller size for easy transport, as is contemplated by the present invention.

Thus, there is a need for a fishing spool holder that not only is novel in its concept and design, but is easy to use, collapsible to be easily transportable, does not introduce fractures or cracks into the fishing rod, eliminates line tension in the line, and does not introduce twists or kinks in the line when transferred from spool to reel.

SUMMARY OF THE INVENTION

According to one aspect of the present invention, the collapsible spool holder hangs from an eyelet on the fishing rod so that it is free to move, and thus does not introduce tension into the fishing line as it is transferred from the spool to the reel or introduce fractures or cracks into the fishing rod.

According to another aspect of the present invention, the collapsible spool holder may be collapsible to fit into a cellular phone carrying case.

Additionally, according to yet another aspect of the present invention, the collapsible spool holder is easily collapsible and transportable.

Moreover, in another aspect of the present invention, the collapsible spool holder is triangular in shape, with the spool being held at the bottom side of the triangle such that the tension of pulling the line from the spool is placed at the top of the holder that hangs from the eyelet of the rod.

In yet another aspect of the present invention, the collapsible spool holder contains the spool in between a tension mechanism of two tension nuts that are adjustable to the width of the spool, allowing the spool to be secure in the spool holder and not move from side to side, but without introducing tension into the fishing line when transferred from the spool to the reel.

According to another aspect of the present invention, the left and right arm of the collapsible spool holder move in concert, such that when one arm is pulled from the top piece that hangs from the eyelet of the rod, the other arm moves approximately the same distance.

Additionally, in another aspect of the present invention, the left and right arm of the collapsible spool holder connect with one another in a joint, that can be a ball and socket joint.

In another aspect of the present invention, a top piece secures the left and right arm of the collapsible spool holder, the top piece having a hook-like element that hangs from the eyelet of the rod and also has a protrusion with a hole that feeds the fishing line from the spool on the collapsible spool holder to the reel.

An object of the present invention is to provide a collapsible spool holder that does not introduce tension or twists or kinks into a fishing line when transferred from spool to reel.

In yet another aspect of the present invention, the bottom piece of the collapsible spool holder opens to easily load the spool onto the apparatus.

Another object of the present invention is to provide a collapsible spool holder that hangs from the fishing rod such that it is not securely attached to the rod when transferring the fishing line from spool to reel and does not introduce cracks or fractures into the fishing rod.

In another aspect of the present invention, the integrity of the rod remains unaffected by the collapsible spool holder's use.

Yet another object of the present invention is to provide a collapsible spool holder that is collapsible to be easily transportable to the sites of the fishing rod's use.

Another object of the present invention is to provide a collapsible spool holder that is easily loaded with the spool.

BRIEF DESCRIPTION OF THE DRAWINGS

The foregoing aspects and many of the accompanying advantages of this invention will become more readily appreciated as the same becomes understood by reference to the following detailed description, when taken in conjunction with the accompanying drawings, wherein.

DETAILED DESCRIPTION

The invention described in detail herein generally relates to a collapsible spool holder for facilitating the movement of fishing line from the spool to the reel of a fishing rod.

Figure 1:
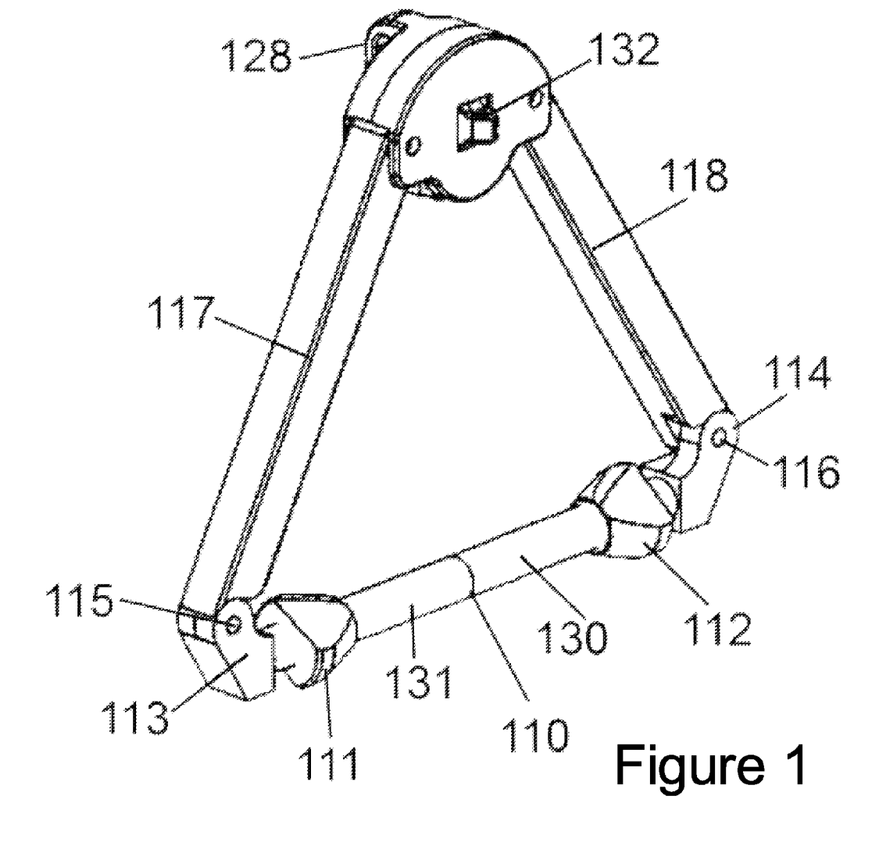
FIG. 1 is a front view of the collapsible spool holder, as in one embodiment of the present invention.
Figure 2:
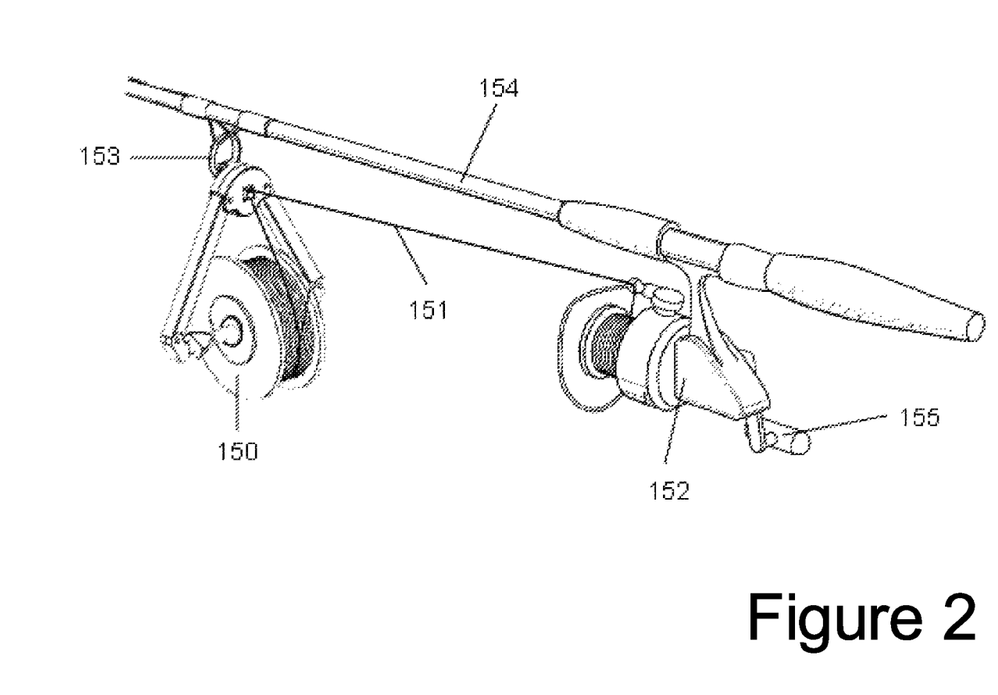
FIG. 2 is a side view of the collapsible spool holder as it hangs from a fishing rod in use, according to one embodiment of the present invention.
Figure 14:
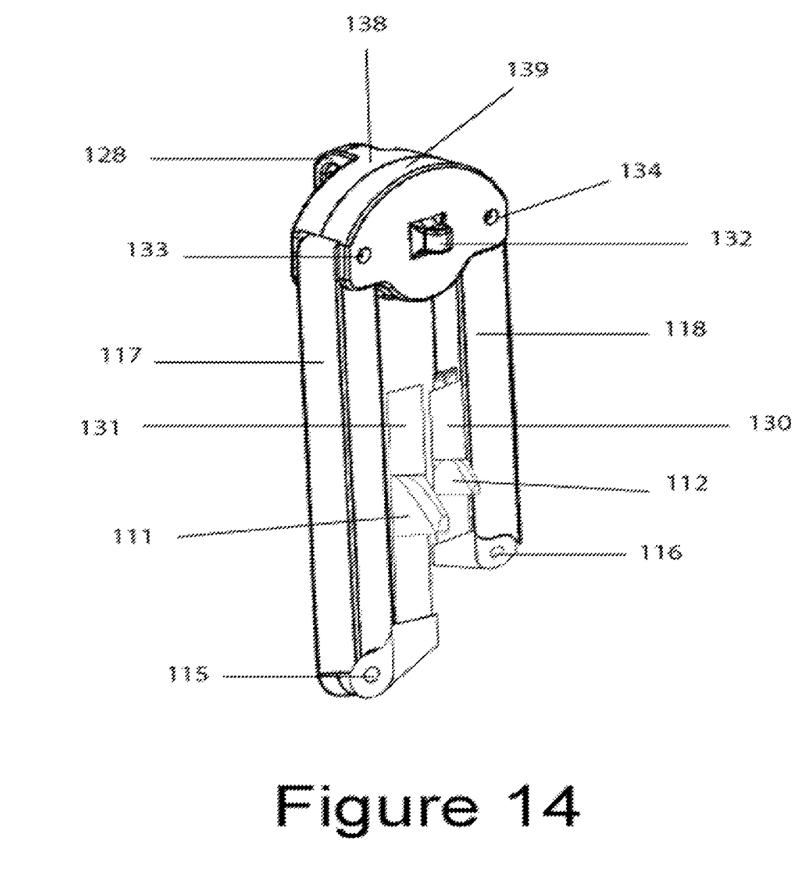
FIG. 14 is an illustration of the collapsible spool holder in its collapsed form, as in one embodiment of the present invention.

FIG. 2 shows the present invention as it is used on a fishing rod 154. The spool of fishing line 150 rests on the present invention spool holder. The present invention is attached to the fishing rod 154 by hanging from an eyelet 153 on the rod by a hook on the spool holder. In the preferred embodiment, the spool holder hangs from the first eyelet of the fishing rod. The fishing line 151 is fed up from the spool, through a protrusion with a hole 132 in the present invention (see FIG. 1). The fishing line 151 then attached and is wound onto the reel 152 by cranking the reel handle 155. When not in use, the collapsible spool holder may be collapsed for easy transport (FIG. 14).

Figure 3:
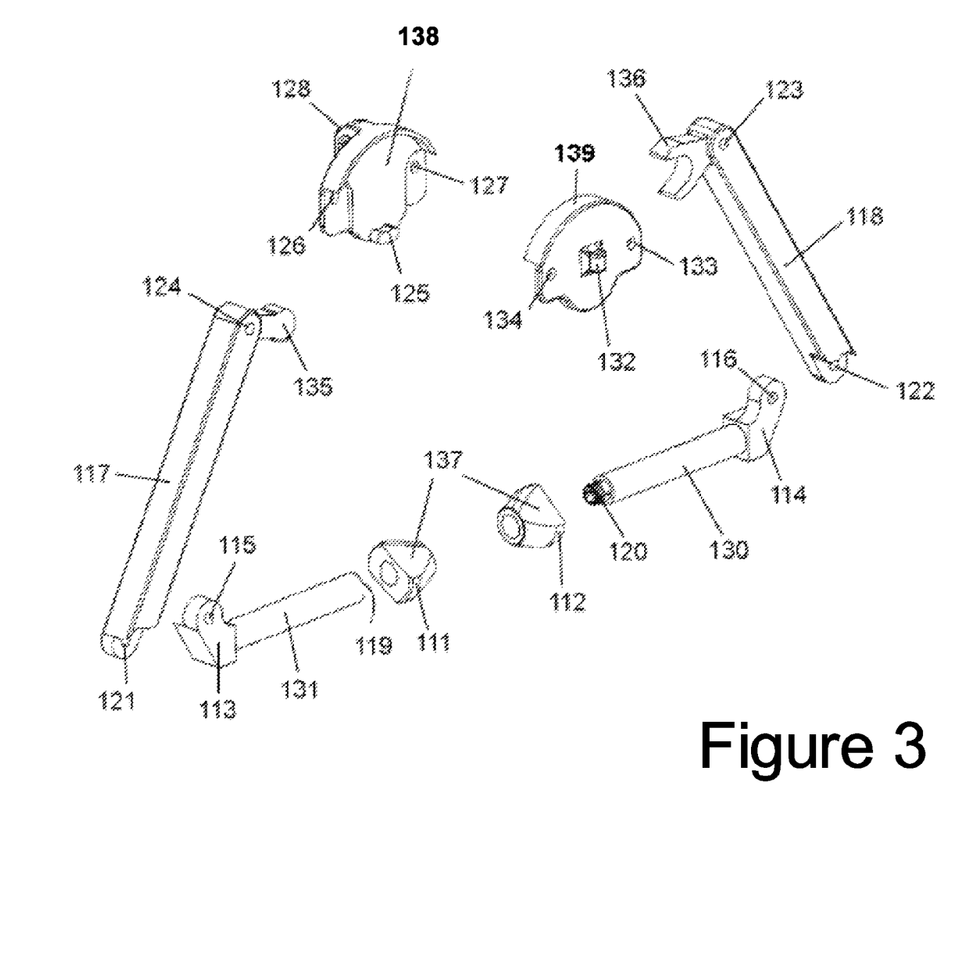
FIG. 3 is an illustration of the parts of the collapsible spool holder, according to one embodiment of the present invention.
Figure 4:
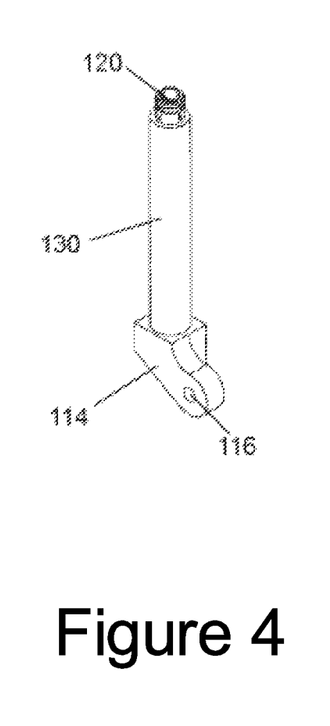
FIG. 4 is an illustration of right bottom piece of the collapsible spool holder, according to one embodiment of the present invention.
Figure 5:
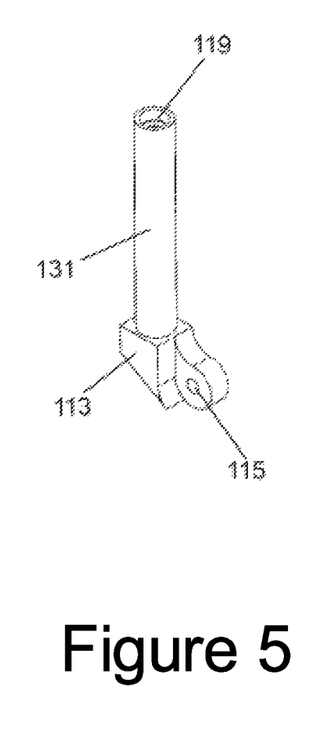
FIG. 5 is an illustration of the left bottom piece of the collapsible spool holder, as in one embodiment of the present invention.

As shown in FIGS. 1, 2 and 3, the spool holder is triangular in shape, as in the preferred embodiment of the invention. The triangular shape (see FIG. 1) allows the tension created from moving the fishing line from the spool to the reel to be moved from the spool to the top piece of the collapsible spool holder (see FIG. 2). The result is that the fishing line, once transferred to the reel, has very little tension and is able to be effectively and efficiently employed. Additionally, because the collapsible spool holder hangs freely from the eyelet of the rod, no fractures or cracks are introduced into the fishing rod (see FIG. 2). The bottom arm of the triangle holds the spool of fishing line when loaded (see FIG. 2). A left 117 and right arm 118 are attached to the bottom arm of the spool holder. The bottom arm of the spool holder can be separated at its approximate midsection 110 into a left 131 and right 130 bottom piece. The left 131 and right 130 bottom piece can be secured with a snap joint consisting of a male 120 and female 119 joint part (FIGS. 3-5). The left 131 and right 130 bottom pieces are able to be separated so that a spool may be loaded onto the collapsible spool holder, and to collapse the spool holder as is subsequently described (see FIG. 14).

Figure 6:
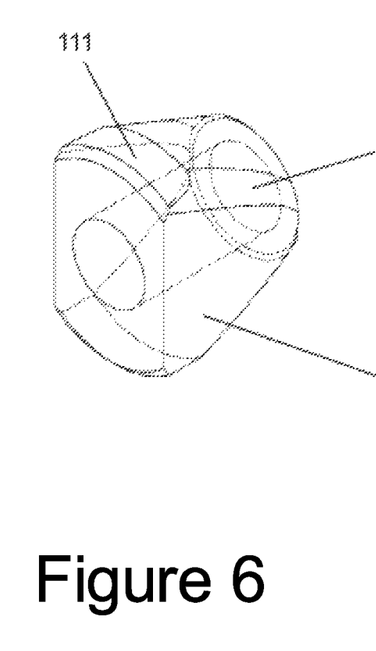
FIG. 6 is an illustration of a tension nut, as in one embodiment of the present invention.
Figure 7:
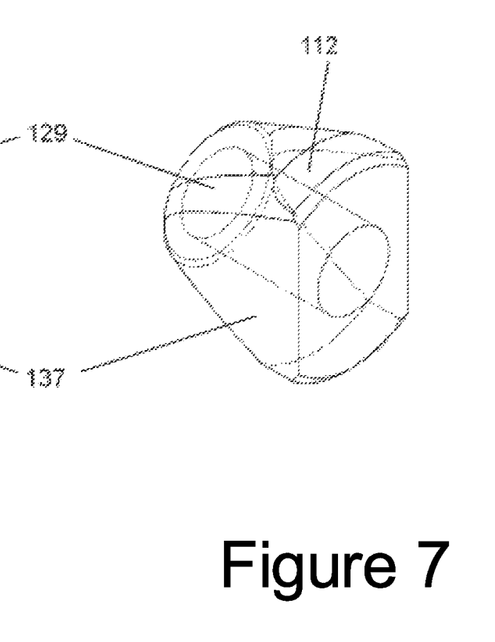
FIG. 7 is an alternative view of a tension nut, according to one embodiment of the present invention.

The bottom arm of the spool holder also has a left 111 and right 112 tension nuts that can be adjusted to the width of the spool so that the spool is secure in the holder and is not free to move along the bottom arm (FIG. 2). As shown in FIGS. 6 and 7, each tension nut (111 and 112) has a hole 129 that the bottom pieces pass through. A tension mechanism that does not include tension nuts can be used, as is known to those skilled in the art. For instance, a spring mechanism can be used on either side of the spool to secure it. Moreover, as in the preferred embodiment of the invention, each tension nut (111 and 112) has two parallel flat sides 137. The flat sides 137 of the left 111 and right 112 tension nuts allow the left 131 and right 130 bottom pieces to be substantially parallel and adjacent to the left 117 and right 118 arm when in its collapsed form (see FIG. 14). The collapsed spool holder can be readily put into a case or transported. In the preferred embodiment the tension nuts are 45' chamfer on side, drilled and taped 5/16-18 hole. Other types of tension nuts or tension mechanisms may be employed, as is apparent to those skilled in the art.

The left 131 and right 130 bottom pieces are attached to a left arm 117 and a right arm 118 of the triangular spool holder, as in one preferred embodiment of the invention. As is seen in FIG. 3 each end of the bottom pieces have a hinge 113 and 114 that connects to a left arm 117 or a right arm 118. The left 113 and right 114 hinge piece connects to the left 117 and 118 right arm pieces via a fastener in the provided openings 115 and 116 (see FIGS. 4 and 5). As in the preferred embodiment, the fastener is a flat head screw, but as is known to those skilled in the art, other fasteners may be employed. The openings 115 and 116 in the bottom left 113 and right 114 hinge piece line up with and connect with the opening in the hinge pieces 121 and 122 on each left 117 and right 118 arm (see FIG. 3). As shown in FIG. 14, when the bottom arm is separated at its midsection 110 the left 113 and right 114 hinge pieces on the bottom and two arms 117 and 118 move so that the left 131 and right 130 bottom pieces are substantially parallel with the left 117 and right 118 arm pieces, and the collapsible spool holder is compact and easy to transport.

Figure 13:
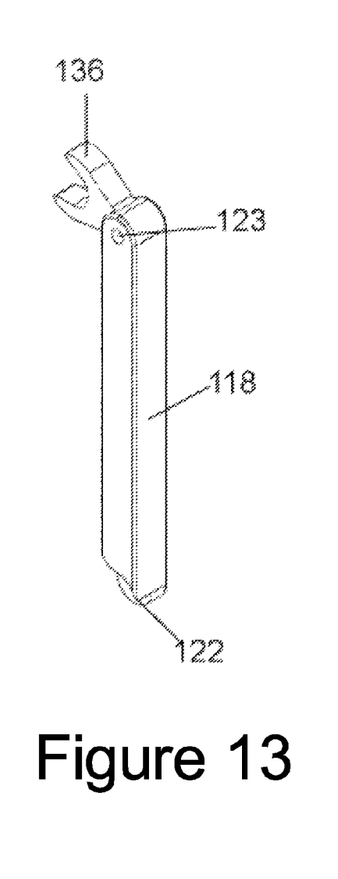
FIG. 13 is an illustration of the right arm of the collapsible spool holder, according to one embodiment of the present invention.

As depicted in FIG. 13, the right arm 118 of the spool holder connects to the bottom piece by a hinge 122, and resides in the top piece with a socket 136 that connects to the ball 135 contained on the left arm 117. The socket 136 is attached to the right arm 118, preferably as a hinge, with an opening 123 for a fastener. The hinge attachment allows the socket 120 to move as needed when collapsing the spool holder.

Figure 12:
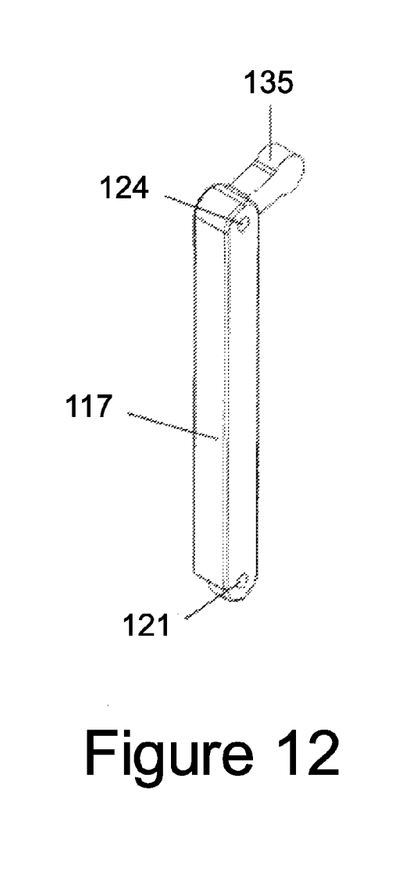
FIG. 12 is an illustration of the left arm of the collapsible spool holder, according to one embodiment of the present invention.

FIG. 12 shows the left arm 117 of the spool holder that connects to the bottom piece by a hinge 121 and resides in the top piece with a ball 135 that connects to the socket 136 on the right arm 118. The ball 135 is attached, preferably with a hinge, to the left arm 117 with an opening for a fastener 124. The hinge attachment allows the ball 135 to move as needed when collapsing the spool holder. The ball 135 and socket 136 function in a way that when the arms are separated, both left 117 and right 118 arm pieces move in concert. The motion of the left 117 and 118 arm pieces is accomplished by the mechanical force exerted on the ball 135 and socket 136 when separating the arms. For example, if force is exerted on the right arm 118, which contains the socket 136 to separate the arms away from the top piece, the left arm 117 will move away from the top piece as well. The left 117 and right 118 arm pieces are able to be separated to facilitate loading the spool onto the holder.

Figure 11:
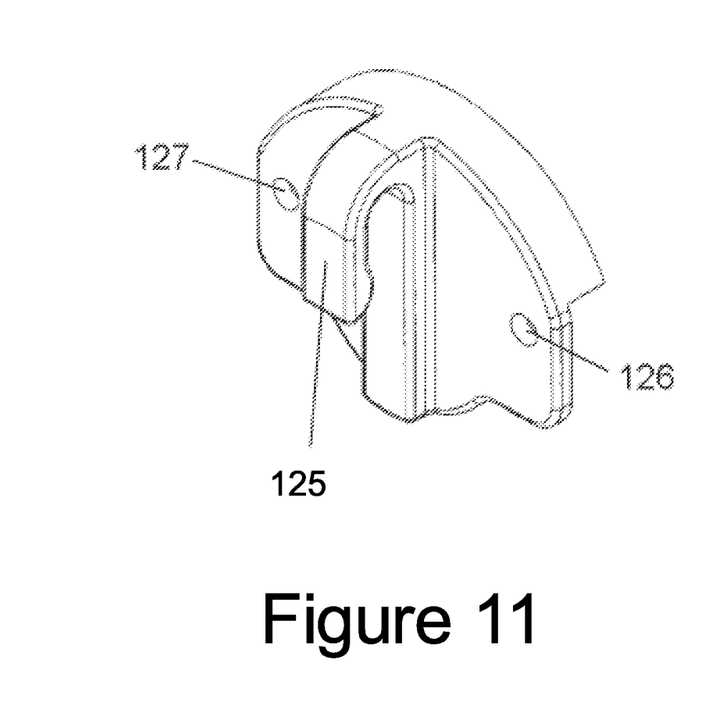
FIG. 11 is a front view of a side of the top piece with the hook, according to one embodiment of the present invention.

The top of the spool holder holds the left 117 and right 118 arm pieces with a hook-like piece that hangs from the eyelet of the fishing rod (see FIG. 2). Two pieces 138 and 139 make up the top piece as shown in FIGS. 8 through 11. The first top piece 138 contains a hook 128 for hanging the spool holder from an eyelet on a fishing rod (see FIGS. 2, 10 and 11). By hanging the collapsible spool holder from the fishing rod, tension in the fishing line is alleviated, thus reducing tension introduced when transferring the fishing line from the spool to the reel. Moreover, by hanging the collapsible spool holder from the eyelet of the fishing rod, no tension is applied to the rod and cracks or fractures are not introduced to the fishing rod. As shown in FIG. 11 two openings 127 and 126 are provided to secure the first top piece 138 to the second top piece 139. As seen in FIG. 11 the inside surface has a protrusion 125 that facilitates the attachment of the first top piece 138 to the second top piece 139 and provides a spacer so that the left 117 and right 118 arms are able to reside within the top piece (see FIG. 3).

Figure 8:
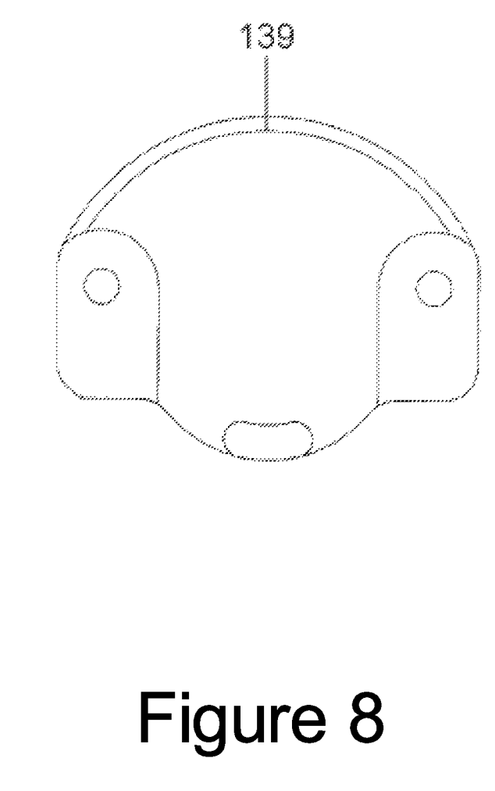
FIG. 8 is a back view of a side of the top piece with the protrusion, as in one embodiment of the invention.
Figure 9:
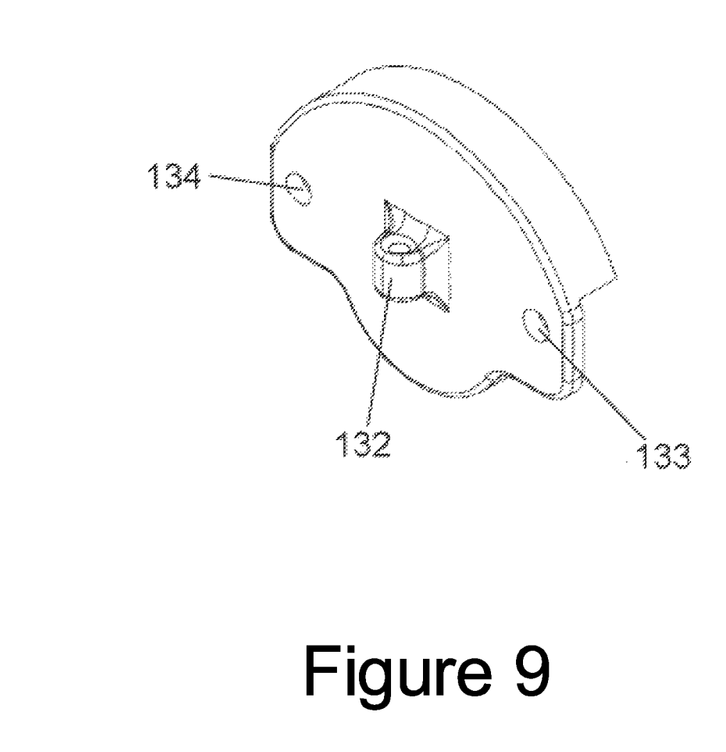
FIG. 9 is a front view of a side of the top piece with the protrusion, according to one embodiment of the present invention.
Figure 10:
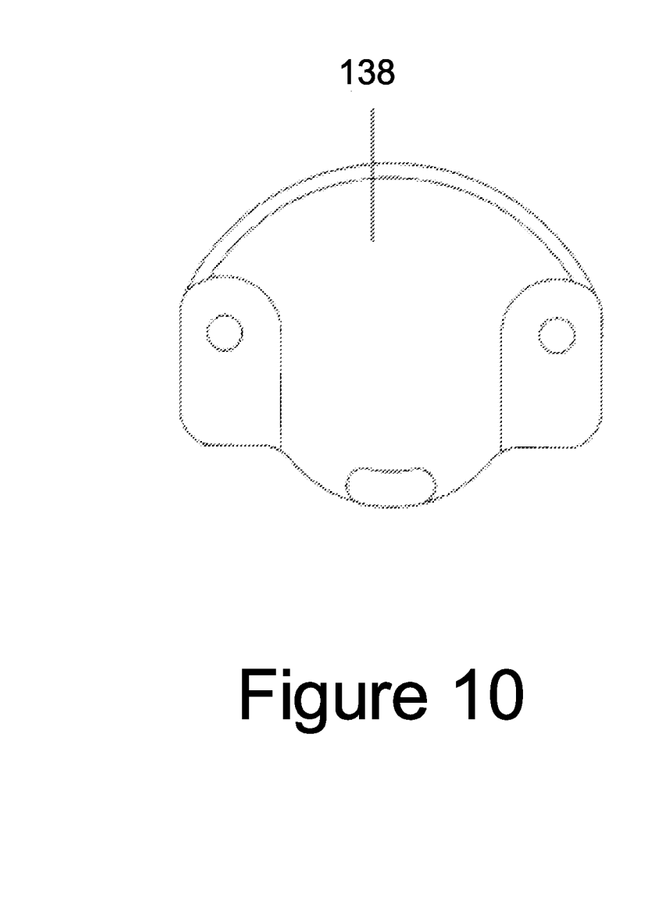
FIG. 10 is a back of a side of the top piece with the hook, according to one embodiment of the present invention.

The second top piece 139 is shown in FIGS. 8 and 9. This piece has a protrusion with a hole 132 in it where the fishing line is fed through from the spool to the fishing line. The protrusion with a hole 132 is oriented such that when the fishing line is taken from the spool to the hole, the fishing line is substantially straight and parallel with the fishing rod and at the approximate midsection of the spool. By feeding the fishing line through this hole 132, tension is alleviated from the spool and thus the fishing line, so that no twists or kinks are introduced into the fishing line as it is being transferred to the reel. Two holes 134 and 133 are provided that match the holes in the first piece 126 and 127 so that the first piece 138 and the second top piece 139 can be attached to one another with fasteners.

When the first top piece 138 and the second top piece 139 are attached to one another, the ball 135 and socket 136 of the left 117 and right 118 arm pieces are contained within the top piece. The ball 135 and socket 136 of the two arms are moveable when attached such that the spool holder may be collapsed so that the left 131 and right 130 bottom pieces are folded in towards the top piece and the left 131 and right 130 bottom pieces are substantially parallel to the left 117 and right 118 arm pieces (see FIG. 14).

The description contained herein is for purposes of illustration and not for purposes of limitation. Changes and modifications may be made to the embodiments of the description and still be within the scope of the invention. Furthermore, obvious changes, modifications or variations will occur to those skilled in the art. Also, all references cited above are incorporated herein by reference, in their entirety, for background and to assist the reader of this disclosure.

While the invention has been shown and described herein with reference to particular embodiments, it is to be understood that the various additions, substitutions, or modifications of form, structure, arrangement, proportions, materials, and components and otherwise, used in the practice and which are particularly adapted to specific environments and operative requirements, may be made to the described embodiments without departing from the spirit and scope of the present invention. Accordingly, it should be understood that the embodiments disclosed herein are merely illustrative of the principles of the invention. Various other modifications may be made by those skilled in the art which will embody the principles of the invention and fall within the spirit and the scope thereof.

I claim:

1. A collapsible spool holder comprising:
    a top piece having at least two sides with a hook on one side and a protrusion with a hole on the other side, wherein the hook hangs the collapsible spool holder when a spool is secured, the top piece capable of housing two arms, each of the two arms having a pivot point within the top piece, creating a first and second pivot point;
    said two arms having two ends and capable of being connected with each other at one end and residing within the top piece, and the other ends of the two arms connected to bottom arm, and having a pivot point connecting the two arms to the bottom arm, creating a third and fourth pivot point;
    the bottom arm having at least two pieces that are capable of being separated, such that when the two pieces are separated they can fold upward toward the top piece such that the two pieces and two arms are substantially parallel with each other such that the four pivot points form a rectangle, and wherein the two adjacent pieces are connected to form the bottom arm, the collapsible spool holder is substantially triangular in shape and the four pivot points are in a triangular shape;
    and at least two tension mechanisms to secure the spool in the approximate middle of the bottom arm.

2. The collapsible spool holder of claim 1, wherein the hook on the top piece is hangs from an eyelet of a fishing rod when the spool is secured and the line is being moved from the spool to a reel on the fishing rod.

3. The collapsible spool holder of claim 1, wherein the protrusion with a hole in the top piece feeds a fishing line from the spool on the bottom arms up through protrusion with a hole and then down to a reel on a fishing rod.

4. The collapsible spool holder of claim 1, wherein the two arms connect to each other with a ball and socket type joint within the top piece.

5. The collapsible spool holder of claim 1, wherein the tension mechanism is at least two tension nuts having two parallel flat sides.

6. A collapsible spool holder comprising:

a top piece having at least two sides wherein one of said at least two sides has a hook that hangs the collapsible spool holder when a spool is secured, and wherein the other of said at least two sides has a protrusion with a hole on the other side, the top piece capable of housing a left and right arm, wherein;

the left and right arms are substantially the same length and having two ends, a first of said two ends of each the left and right arm capable of residing in the top piece, said left and right arm being connected to one another within the top piece, and wherein the first of said two ends of the left and right arm create a first and second pivot point, and the left and right arm connected by a hinge to a left and right bottom piece at a second of said two ends, creating a third and fourth pivot point;

the left and right bottom pieces being substantially the same length and hingeably connected at the third and fourth pivot point and capable of being connected and separated at their other end, and wherein when the left and right piece of the bottom piece are separated, they are capable of being folded inward toward the top piece such that the left and right bottom pieces are substantially parallel to the left and right arm where the left and right bottom pieces are adjacent to each other and interior to the left and right arms, such that the four pivot points form a rectangle, and wherein when the left and right bottom pieces are connected, the collapsible spool holder and pivot points are substantially triangular in shape;

and a tension mechanism that aligns a spool on the bottom arm's substantially at the bottom arm's midsection so that the spool is secure.

7. The collapsible spool holder of claim 6, wherein the hook on the top piece hangs from an eyelet of a fishing rod when the spool is secured and the line is being moved from the spool to a reel on the fishing rod.

8. The collapsible spool holder of claim 6, wherein the protrusion with a hole in the top piece feeds fishing line from a spool on the bottom arm to a reel on a fishing rod.

9. The collapsible spool holder of claim 6, wherein the left and right arms connect with each other with a ball and socket type joint within the top piece.

10. The collapsible spool holder of claim 6, wherein the tension mechanism is at least two tension nuts having two parallel flat sides.

11. The collapsible spool holder of claim 6, wherein the left and right arm's connect with each other with a ball and socket type joint.

12. A collapsible spool holder for use with a fishing rod comprising:

a top piece having at least two sides wherein one side has a hook and another side has a protrusion with a hole, wherein the hook is to be used in conjunction with an eyelet of the fishing rod so that the collapsible spool holder hangs from the eyelet, the two sides being substantially parallel to one another, and the protrusion with a hole capable of receiving a fishing line from a spool, and the top piece capable of housing a left and right arm, wherein;

the left and right arms are substantially the same length have two ends, one end of each the left and right arm capable of residing in the top piece, the left and right arm capable of being connected to each other, creating a first and second pivot point, and left and right arm connected by a hinge to a left and right bottom piece at the other end, creating a third and fourth pivot point;

the left and right bottom pieces capable of holding the spool when connected and being substantially the same length and capable of being connected, wherein when the left and right bottom piece are connected the collapsible spool holder and pivot points are substantially triangular in shape, and wherein the left and right piece of the bottom piece are separated they can be folded inward toward the top piece at the third and fourth pivot point such that the left and right bottom pieces are substantially parallel to the left and right arm where the left and right bottom pieces are adjacent to each other and inside the left and right arms, the four pivot points being substantially rectangular in shape;

and at least two tension nuts on the bottom arm, each of said at least two tension nuts having two parallel flat sides and capable of aligning the spool in the middle of the bottom arm.

13. The collapsible spool holder of claim 12, wherein the protrusion with a hole in the top piece feeds the fishing line from the spool on the bottom arm's to a reel on the fishing rod.

* * * * *